(12) United States Patent
Bland (10) Patent No.: US 6,189,526 B1
(45) Date of Patent: Feb. 20, 2001

(54) BARBECUE

(75) Inventor: Albert Arthur Bland, London (GB)

(73) Assignee: Springair 2000 Limited, Isle of Man (GB)

( * ) Notice: Under 35 U.S.C. 154(b), the term of this patent shall be extended for 0 days.

(21) Appl. No.: 09/381,679

(22) PCT Filed: Sep. 14, 1998

(86) PCT No.: PCT/GB98/02771

§ 371 Date: Sep. 24, 1999

§ 102(e) Date: Sep. 24, 1999

(87) PCT Pub. No.: WO99/13758

PCT Pub. Date: Mar. 25, 1999

(30) Foreign Application Priority Data

Sep. 12, 1997 (GB) .................................................. 9719489

(51) Int. Cl.[7] .................................................. F24C 15/08
(52) U.S. Cl. .................................................. 126/8; 126/25 R
(58) Field of Search .................. 126/8, 9 R, 25 R, 126/41 R, 1 R, 1 D, 506, 9 B, 12, 13; 99/447, 449, 450

(56) References Cited

U.S. PATENT DOCUMENTS

| | | | | |
|---|---|---|---|---|
| 2,499,156 | * | 2/1950 | Paolella | 126/8 |
| 2,728,334 | * | 12/1955 | Paolella | 126/25 R |
| 3,548,803 | * | 12/1970 | Vogel | 126/8 |
| 3,557,770 | * | 1/1971 | Szentkuti | 126/25 R |
| 3,561,420 | * | 2/1971 | Paolella | 126/8 |

FOREIGN PATENT DOCUMENTS

| | | | | |
|---|---|---|---|---|
| 1810895 | * | 2/1979 | (DE) | 126/8 |
| 2398972 | * | 2/1979 | (FR) | 126/8 |
| 2609881 | * | 7/1988 | (FR) | 126/8 |

* cited by examiner

Primary Examiner—James C. Yeung
(74) Attorney, Agent, or Firm—Clark & Brody (57) ABSTRACT

A barbecue (10) comprising a number of components which can be readily assembled and disassembled without the need for fixing agents, including support structures (12, 14) comprising one or more structural components (22, 24, 26, 28) which can be fitted together by interengageable elements (30, 32), the structures (12, 14) supporting holding means (42) for holding a barbecue tray (16). The structural components (22, 24, 26, 28) are also suitable for the construction of walls and the like.

9 Claims, 11 Drawing Sheets

BARBECUE

TECHNICAL FIELD

The present invention relates to a barbecue, especially for use in the garden.

BACKGROUND

Previously, it has been necessary for people who wish to have a barbecue in their garden to build it from basic components, such as bricks, mortar and concrete sheets or blocks. This is a time-consuming process and means that such barbecues are not easily assembled by people who are not familiar with various building techniques, such as bricklaying. Alternatively, it has been possible to purchase ready-made barbecues which are made of metal. These have the disadvantage that they cannot be left outdoors through the winter as they will rust and necessitate storage of a bulky item indoors.

SUMMARY OF THE INVENTION

It is an aim of the present invention to provide a selfbuild barbecue assembly which is easy to assemble and made from relatively few durable components.

Accordingly, a first aspect of the present invention is directed to a structural component which can be fitted to one or more further structural components by integral interengageable elements.

This is advantageous in that the structural components can be fitted together to form a structure without the need for joining agents such as mastic, fine clay, sand and cement. Such a structure can be readily assembled by those unskilled in conventional building techniques, and can also be dismantled and relocated as required.

In a preferred embodiment, the interengageable elements comprise a protrusion and a corresponding indentation in the components being joined. The advantage of this is that the components can be joined very simply and in a structurally secure method.

A second aspect of the present invention is directed to a barbecue comprising components which can be assembled and disassembled, which include holding means adapted to secure a barbecue tray, and a plurality of support structures providing support for the holding means, in which the holding means engages the support structures via interengageable elements and in which each support structure comprises one or more structural components which can be fitted together by similar interengageable elements.

An advantage of this is that the barbecue can be put together using relatively few parts and does not need any mastic or other joining agents to secure the structure. Furthermore, the ability to break the structure down into few parts allows for easy handling of individual parts and relatively simple transport.

Preferably, the holding means is a top which can be equipped with a hole to accept a barbecue tray and can be fire-resistant. This has the advantage that the tray simply fits into the top and heat from the barbecue tray will not adversely affect the top.

Preferably, the top is further equipped with a chimney, similarly fitted together by interengageable elements. This provides the advantage that the smoke from the barbecue is directed away from the users.

In a preferred embodiment, the top is provided with a water drip. This may take the form of a groove running around the edge of the upper surface of the top.

Advantageously, the top comprises a plurality of sections which interlock along their adjacent edges. A small section is less susceptible to accidental fracture during loading, transportation and installation than a complete top, so this arrangement reduces the risk of damage to a barbecue, particularly to a large barbecue with an extensive top.

Preferably, the support structures comprise two side walls and a back wall.

In a preferred embodiment, underneath the top, spaced apart in a downward direction therefrom there is provided a shelf, which is similarly supported by and fitted together with the support structures. This provides the advantage that items such as food or implements can be stored in an easily accessible place close to the barbecue.

Advantageously, the top is equipped with a surround which encompasses three sides of a barbecue tray. This has the advantage that wind is kept away from the barbecue tray, and also that the food being cooked on the barbecue tray, such as hot fat droplets can only travel in wind direction.

Advantageously the barbecue further comprises a base of substantially uniform thickness. This may be made of, for example, stone, and be the same shape of the underside of the barbecue walls. This is advantageous in that a level surface is thereby provided on which the barbecue can be constructed more securely.

A third aspect of the present invention is directed to a wall comprising a plurality of structural components fitted together by integral interengageable elements. This provides a self-build wall that can be simply and rapidly assembled, and has the nature of a dry stone wall.

BRIEF DESCRIPTION OF THE DRAWINGS

Examples of barbecues made in accordance with the present invention will now be described with reference to the accompanying drawings, in which.

DETAILED DESCRIPTION OF THE PREFERRED EMBODIMENT

Figure 1:
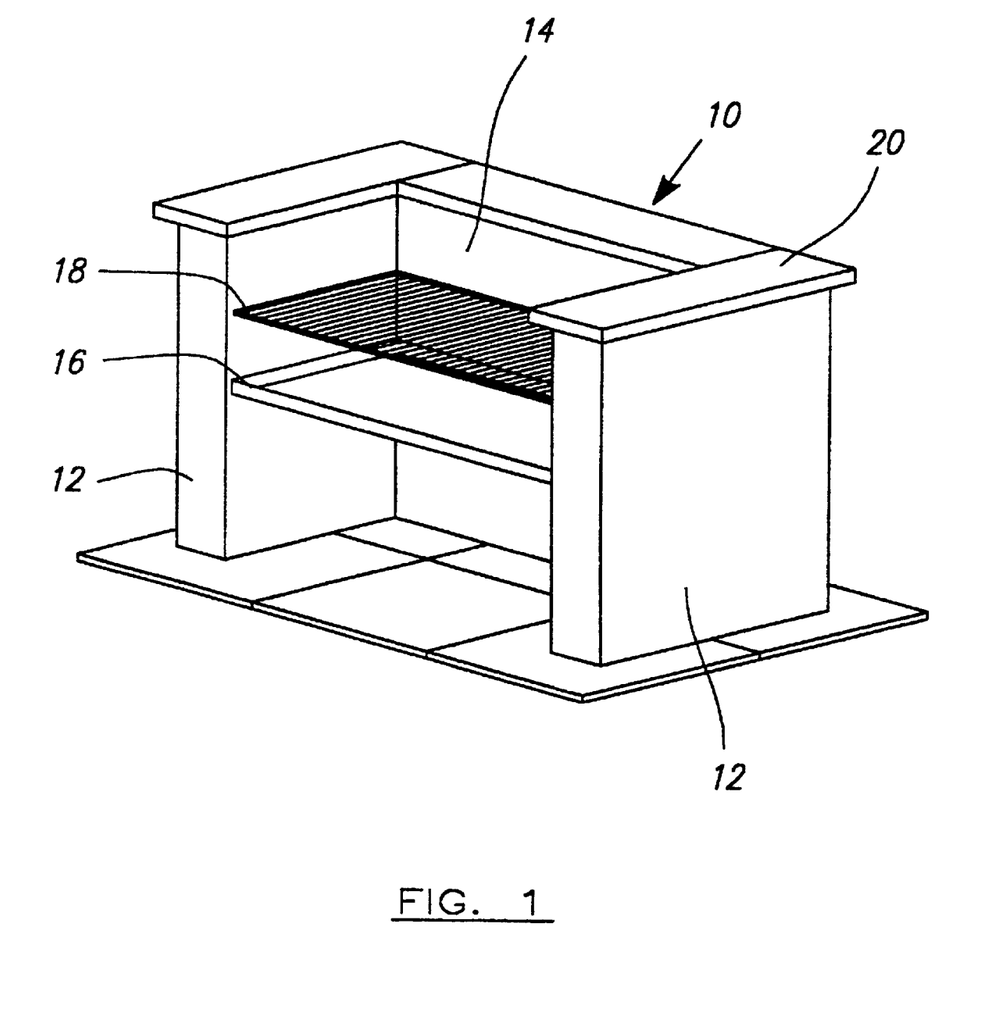
FIG. 1 shows a perspective view from the front of such a barbecue.

FIG. 1 shows a barbecue 10 in an assembled form comprising support structure means formed by two side walls 12 and a back wall 14. Suspended from the three walls is a barbecue tray 16, above which is suspended a grill tray 18. The walls have a top surround 20. The walls are made of blocks made of the usual building materials, which have the appearance of a brick structure, or a random stone finish.

Figure 2:
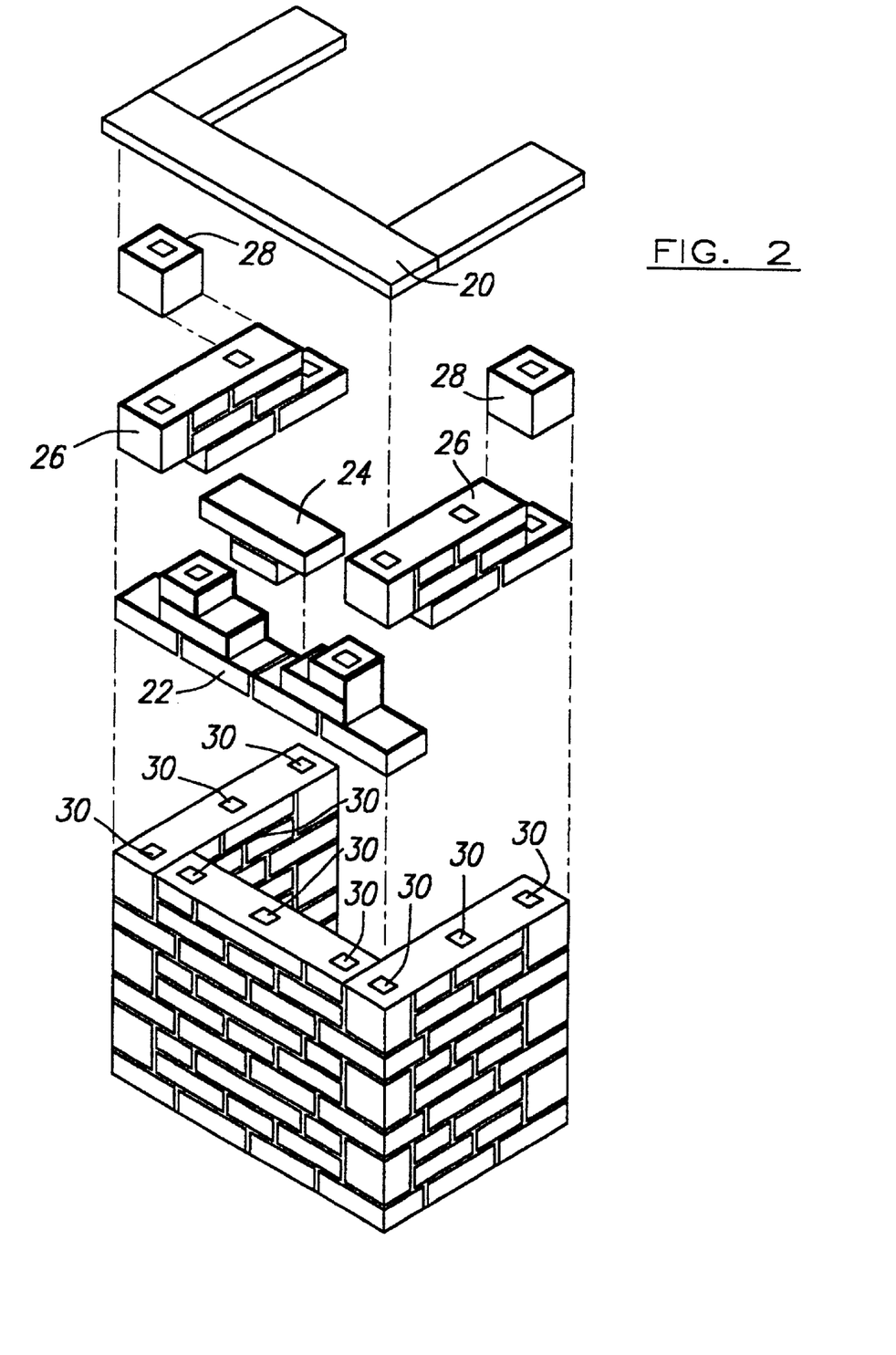
FIG. 2 shows an exploded view of this barbecue.
Figure 3:
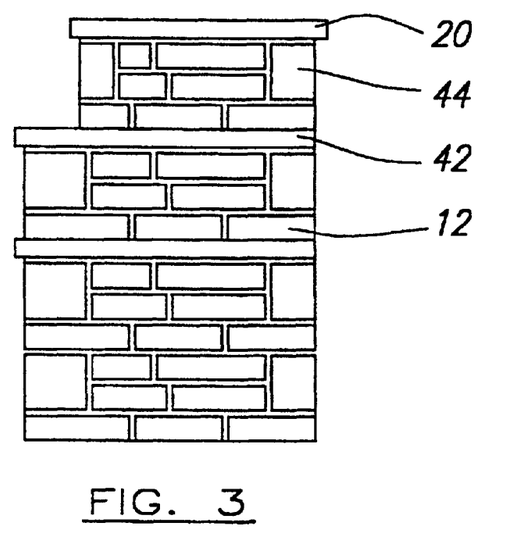
FIG. 3 shows a side view of a modified version of the barbecue in FIG. 1.
Figure 4:
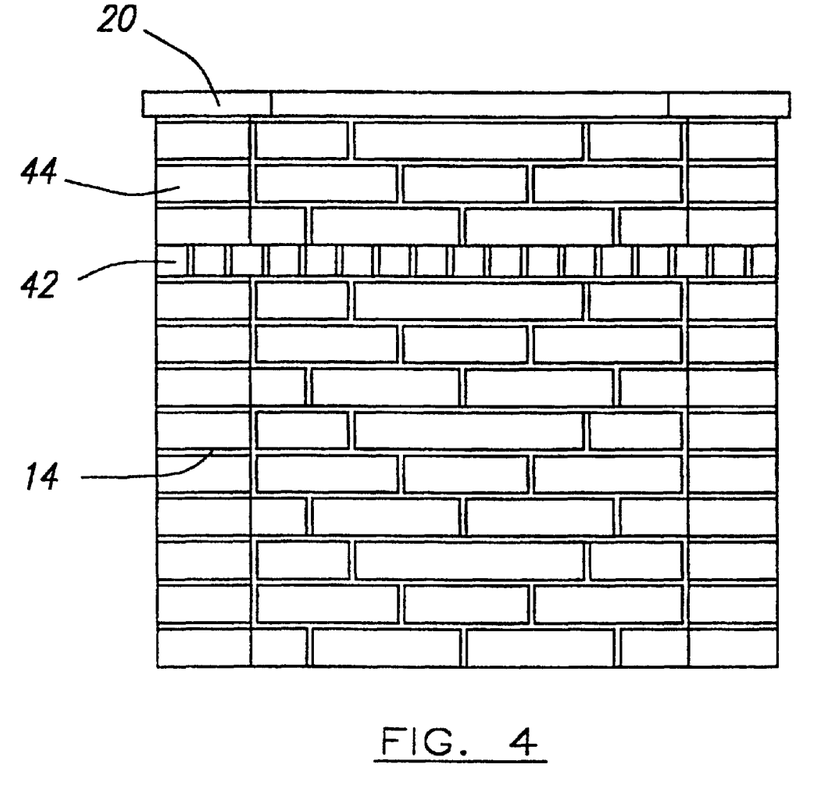
FIG. 4 shows a back view of the barbecue of FIG. 3.
Figure 10:
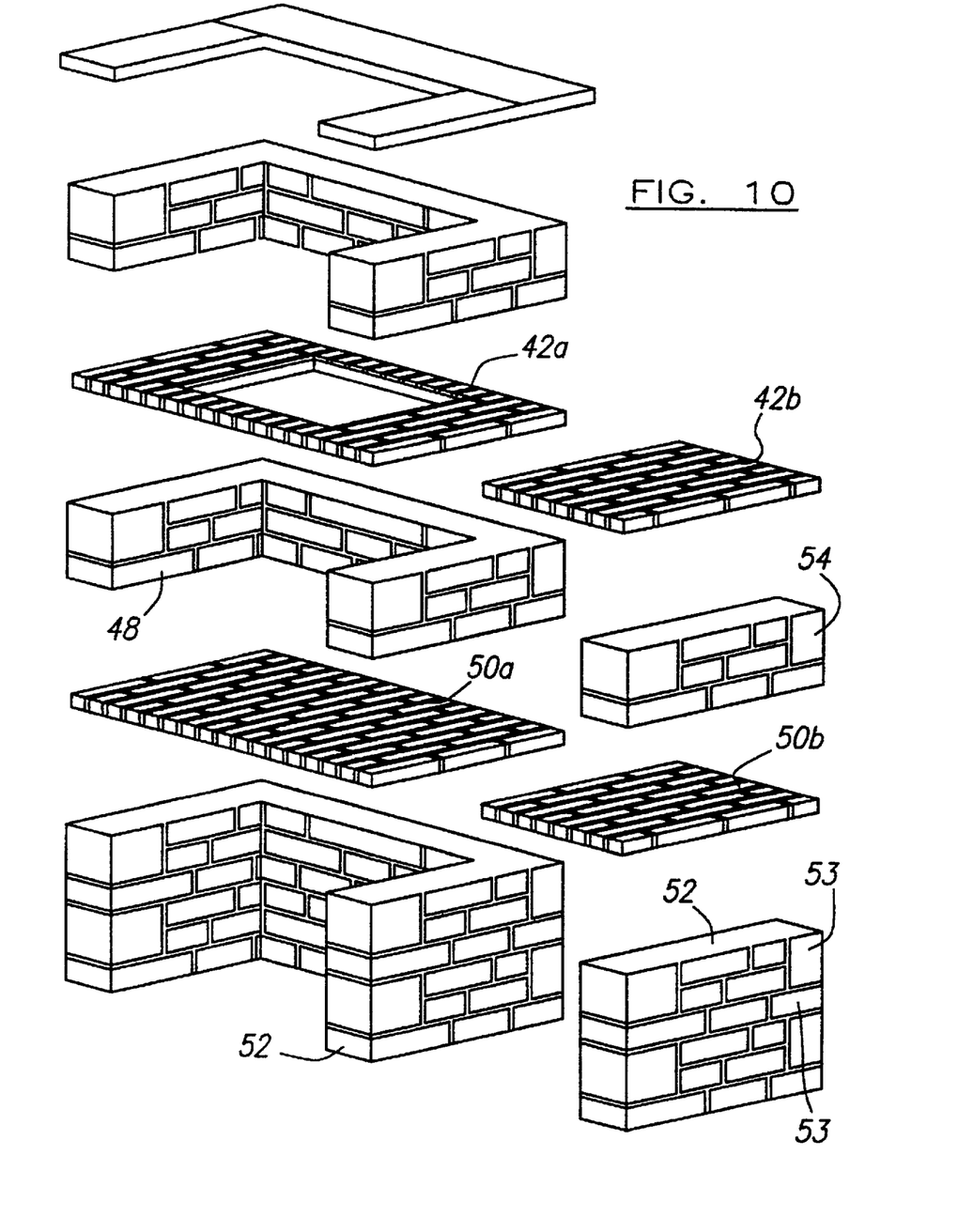
FIG. 10 shows an exploded view of the barbecue shown in FIG. 6.

FIG. 2 shows how the walls of the barbecue 10 are broken up into separate sections. There can be a number of these sections, depending upon the height and length of the barbecue required. Each section is comprised of a number of interengaging structurel components, such as; blocks. The Figure shows one such section exploded, in which there is a rear block 22 which is a castellated structure, in the middle of which fits a block 24 with a downward engaging part which fits into the middle of the two castellations in block 22. Each end of the block 22, at the corners thereof, engages at either end with blocks 26 which form a side wall. The top of block 26 fits over the bottom of block 22. The other end of block 26 has a further block 28 which fits into its upper forward corner. The thus formed section has a U-shape with flat top and bottom surfaces, which are equipped with engagement (interengageable) elements to fit further sections together. In the example shown, four such sections of blocks have been assembled. The top of the constructed walls have a number of engagement elements which enable top surround 20, in this case, or a top, to be fitted in a stable manner. On the insides of the walls there are protruding formations which support the barbecue tray 16 and the grill 18. A side view of the assembled barbecue 10 is shown in FIG. 3. In this case, a top 42 as shown in FIG. 10 has been inserted between two sections and a back view of this barbecue 10 is shown in FIG. 4.

Figure 5:
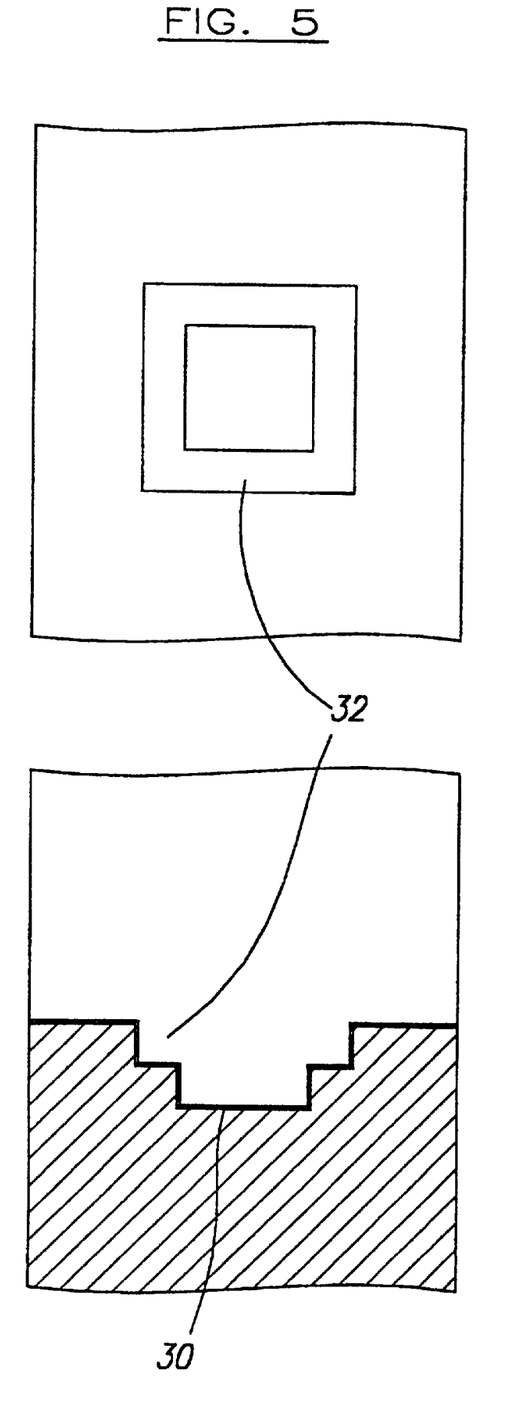
FIG. 5 shows a top and cross-sectional view of the joint used in assembling the barbecue in FIG. 1.

FIG. 5 shows the engagement element which is present between each of the blocks 22, 24, 26, 28 and between the sections of wall and other components to ensure constructional stability. This comprises a stepped hole formation 30 and a similarly stepped protrusion 32 which engages with the hole 30 in a form fitting manner. In the example shown, the protrusions 32 project downwards, although obviously this arrangement can be reversed.

Figure 6:
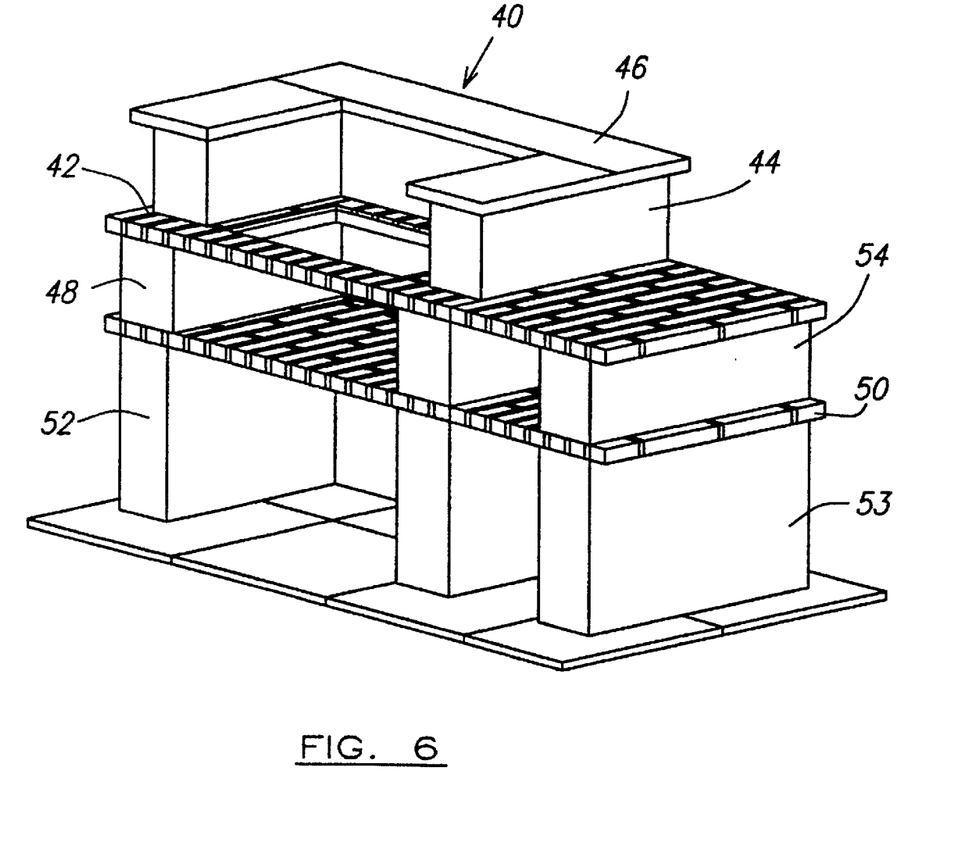
FIG. 6 shows an expanded barbecue.

FIG. 6 shows a barbecue 40 which has more parts than the barbecue 10. However, the various parts of the barbecue 40 are identical to those in barbecue 10. In this instance, there is a top 42, or holding means provided to support the barbecue tray in a hole formed in the top 42. Above the top 42, there is a U-shaped wall section 44 comprising support structure means, preferably side and back walls, and a top surround 46. Underneath the top 42, there is a further U-shaped supporting wall section 48 which rests on a shelf 50. The shelf 50 rests on support structure means formed by side and back walls 52 which are composed of a number of U-shaped wall sections. The top 42 and the shelf 50 extend beyond the side of the walls 52 and 48 to create extra storage space which is supported by bottom side walls 52 to support the shelf and upper side wall 54 which supports the top 42.

Figure 7:
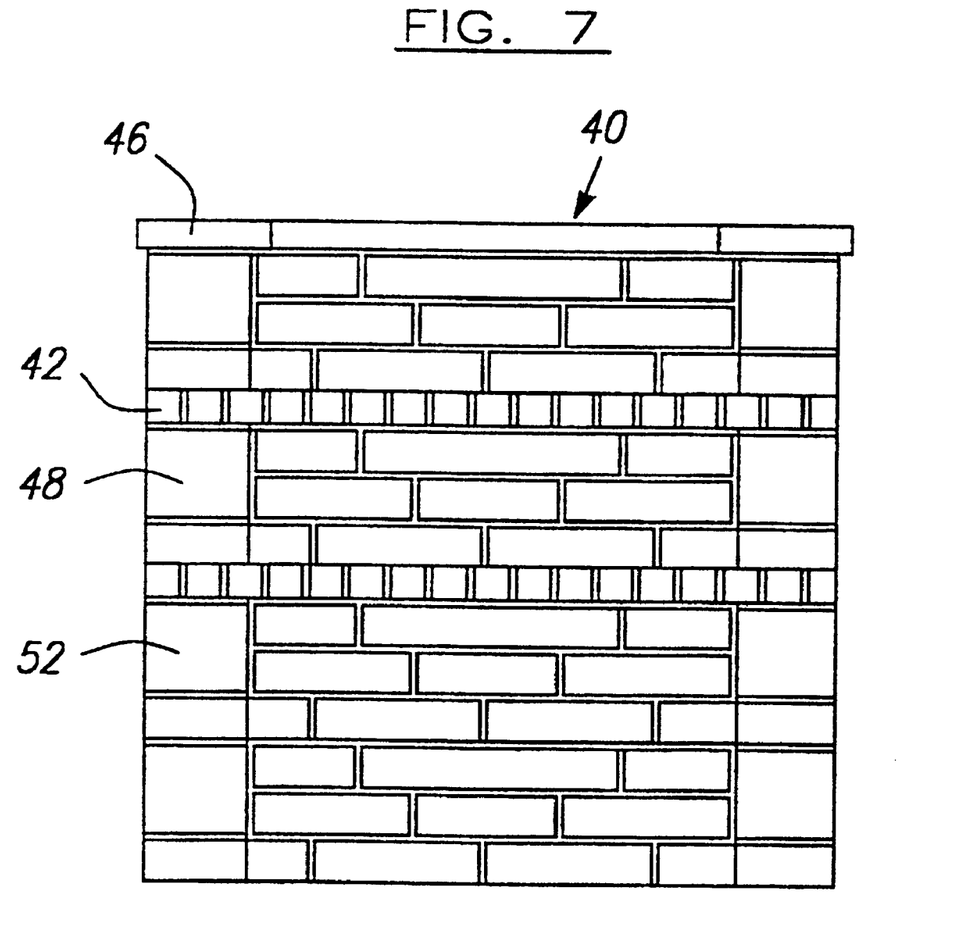
FIG. 7 shows a view of one side of the barbecue shown in FIG. 6.

FIG. 7 shows an end view of the barbecue 40.

Figure 8:
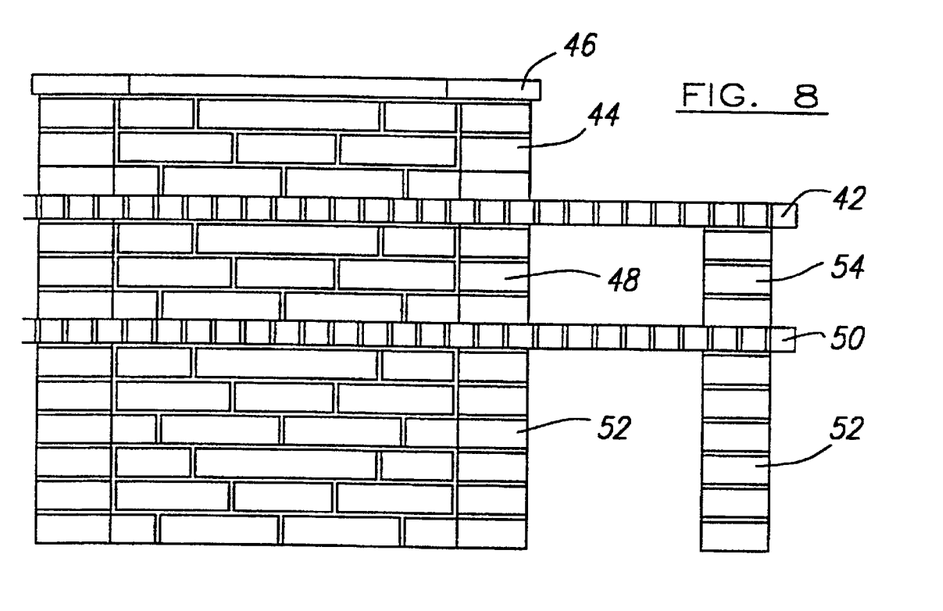
FIG. 8 shows a back view of the barbecue shown in FIG. 6.

FIG. 8 shows a back view of the barbecue clearly showing the extended shelf space.

Figure 9:
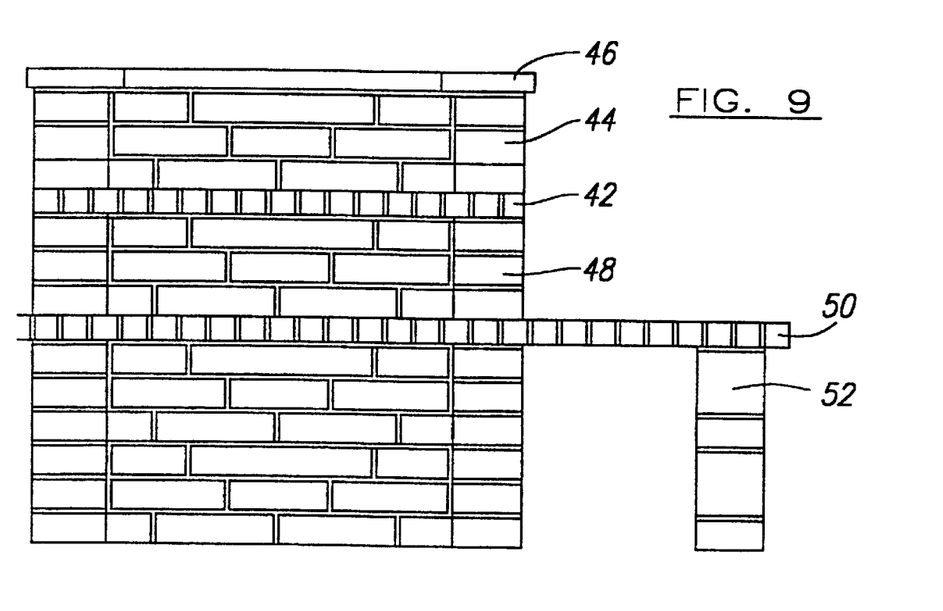
FIG. 9 shows a back view of the modification of the barbecue shown in FIG. 6.

FIG. 9 shows a modification of the barbecue 40 in which the top 42 does not extend to the side of the main barbecue to create the extra shelf space but, however, the shelf 50 does.

FIG. 10 shows an exploded view of the parts that make up the barbecue 40. As can be clearly seen from this, the top 42 is composed of two parts 42a and 42b; 42b provides the side shelf. Similarly, the shelf 50 is composed of two parts; 50a which is the main barbecue and 50b which provides the side shelf. Similarly, each one of the wall sections 48, 52, 53, 54 can be broken down into similar individual blocks, as discussed with regard to barbecue 10.

Figure 11:
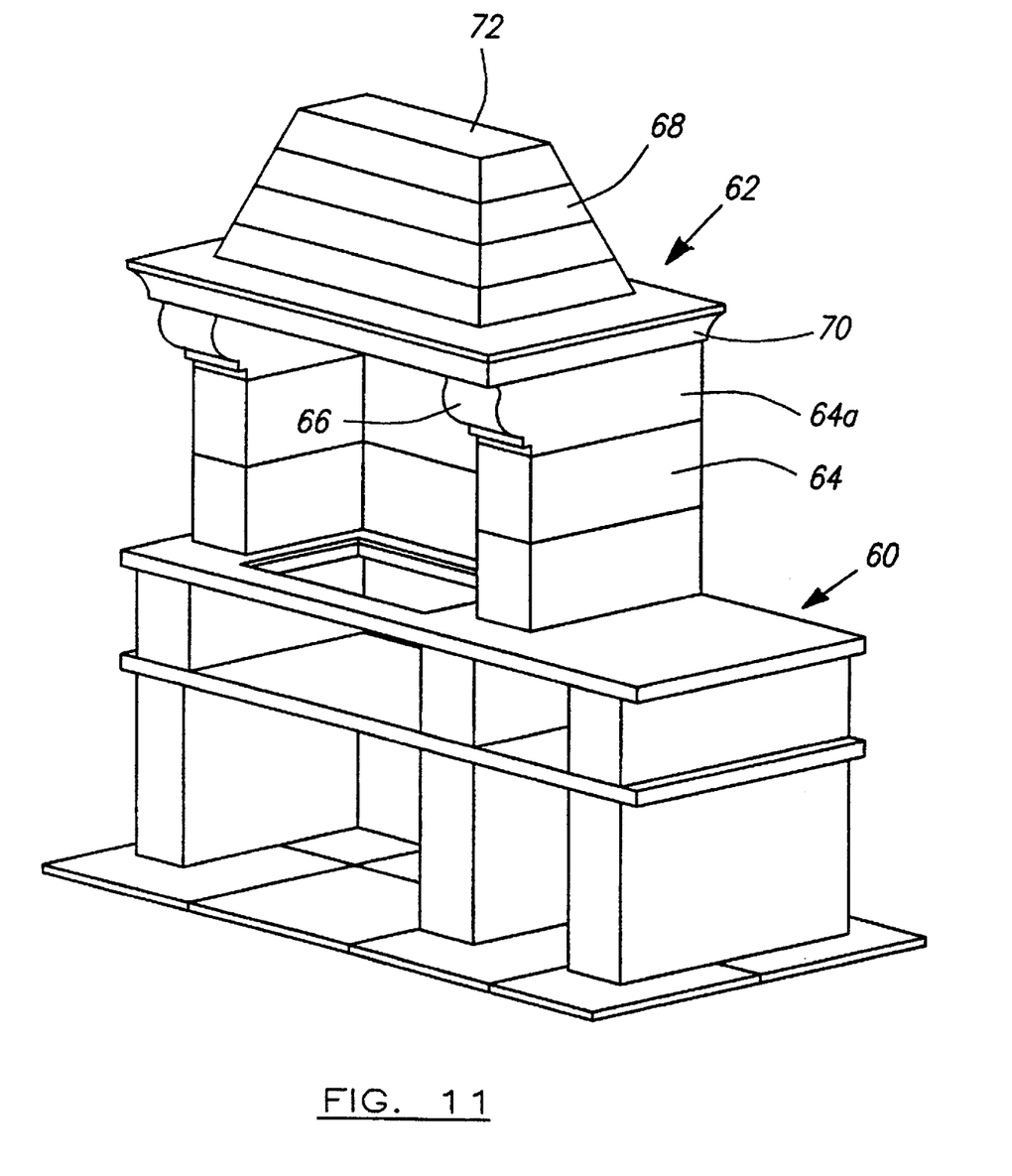
FIG. 11 shows a modification of the barbecue shown in FIG. 6.

FIG. 11 shows barbecue 60. In place of the U-shaped wall section 44 on barbecue 40, there is an added chimney piece 62; the chimney piece 62 comprises side and back walls 64 which are comprised of three U-shaped wall sections; the top one of which 64a has an extending cornice 66. On top of the walls 64, there is a chimney piece 68 which has a base 70 that fits on top of the wall 64 with a tapering top part 72.

Figure 12:
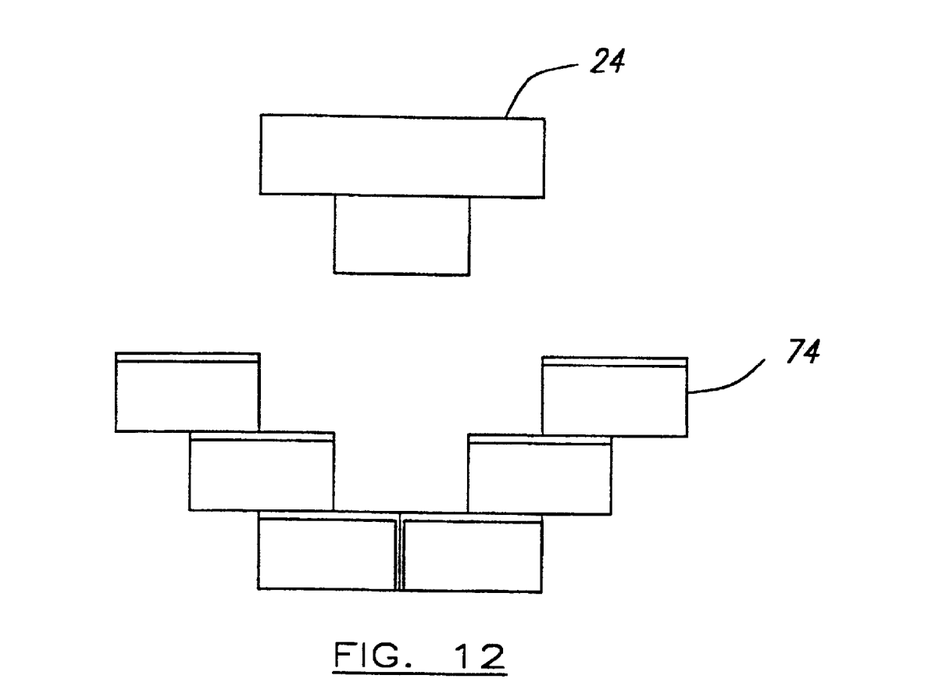
FIG. 12 shows a modification of the blocks used to construct the barbecues shown in the preceding Figures.

It will be readily apparent to a reader skilled in the art that the barbecues described herein can be further expanded using parts similar to those described herein joined via the engagement elements herein to produce a larger barbecue range. For example, FIG. 12 shows the block 24, which acts as a keystone in the previously described barbecue designs, and a further block 74 which is adapted to cooperate with the block 24 and the blocks 22 and 26 to allow the construction of a longer barbecue.

Figure 13:
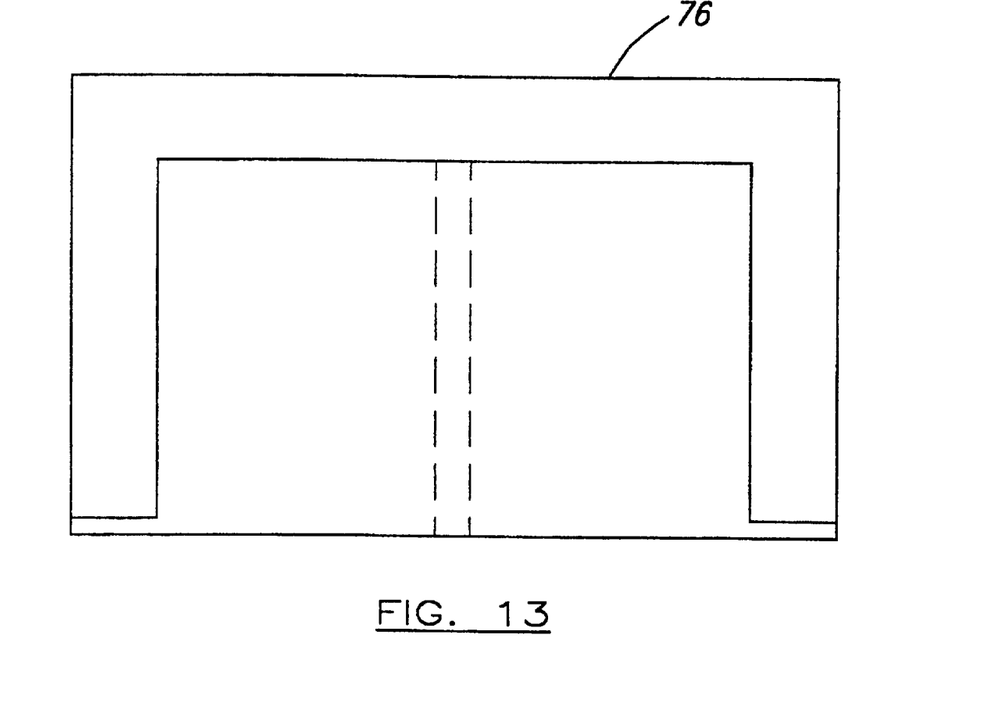
FIG. 13 shows a top view of a base for the barbecues shown in the preceding Figures.

The barbecue may be further provided with a base 76 of, for example, stone, having uniform thickness and being of the same size as the underside of the walls of the barbecue, as illustrated in FIG. 13. This serves to secure the sections of the walls, and to provide a level surface upon which the barbecue can be built.

Figure 14:
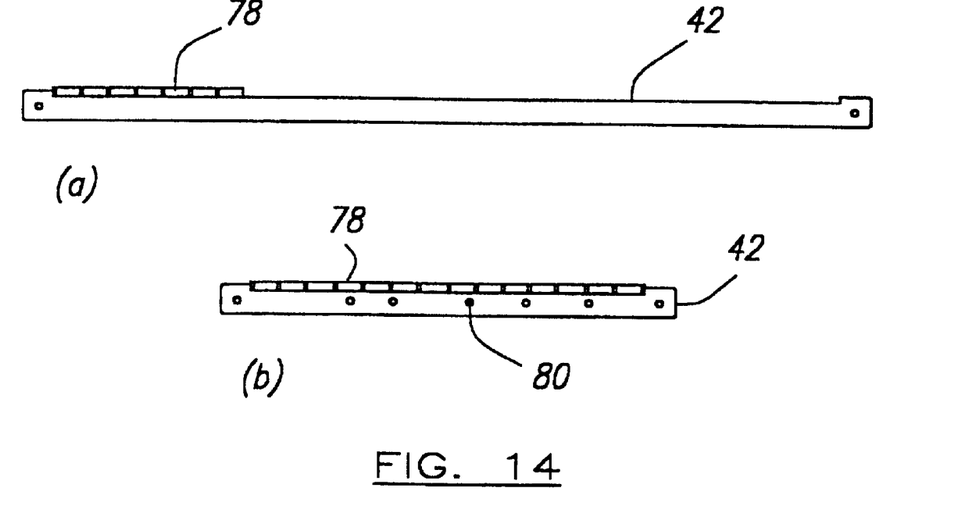
FIG. 14 shows (a) a side view and (b) an end view of a barbecue top.

In addition, the top of the barbecue may be provided with a groove cut around the edge of the upper surface to act as a water drip. FIG. 14 shows a side view and an end view of a barbecue top 42, having an upper surface formed to give the appearance of bricks, stones or tiles 78. Internal reinforcing rods 80 running the length of the top 42 are also provided.

Figure 15:
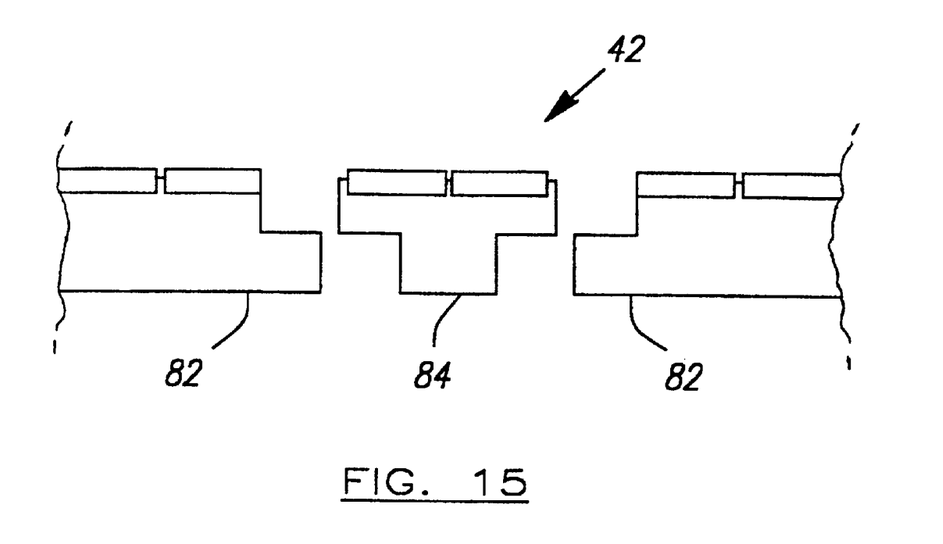
FIG. 15 shows a barbecue comprising three sections.

Furthermore, the top may comprise a plurality of sections. FIG. 15 shows a top 42 made up of three sections 82, 84, in which the sections interlock at their adjacent edges, and the central section 84 acts as a keystone to hold the sections together. In the illustrated embodiment, the central section 84 is a narrow strip. However, the width of each section may be varied as required, so that, for example, a top may comprise three sections of equal size. Such a top is suitable for use with barbecues such as those illustrated in FIGS. 6, 7 and 8, where a relatively large top is required.

It will be further apparent that the structural components fitted together with interengageable elements as described herein are not only applicable to the construction of barbecues and walls, but can be readily applied to other simple structures such as pedestals for statuary.

What is claimed is:

1. A barbecue comprising a plurality of components that are capable of being assembled together and disassembled, wherein said components comprise holding means for holding a barbecue tray and a plurality of support structure means for supporting said holding means, and wherein said holding means and said support structure means further comprise interengageable element means for fitting one or more of said support structure means and said holding means together and further wherein each of said support structure means comprises one or more structural components having interengageable element means for fitting said structural components together, and further wherein at least one of said structural components is a keystone.

2. A barbecue according to claim 1, in which the holding means comprises a top equipped with a hole to accept a barbecue tray and is fire-resistant.

3. A barbecue according to claim 2, further comprising a chimney having said interengageable elements.

4. A barbecue according to claim 2, wherein said top comprises a plurality of sections having adjacent edges that interlock.

5. A barbecue according to claim 1 wherein the support structures comprise two side walls and a back wall.

6. A barbecue according to claim 1, further comprising a shelf that is underneath the holding means and spaced apart in a downward direction therefrom, said shelf being supported by and fitted together with the support structures.

7. A barbecue according to claim 1 further comprising walls adjacent the holding means encompassing three sides of a barbecue tray.

8. A barbecue according to claim 1 and further comprising a base of substantially uniform thickness beneath said support structure means.

9. A barbecue according to claim 1 wherein said interengageable elements comprise protrusions and corresponding indentations in the components to be joined.

* * * * *